United States Patent [19]

Leszczewski

[11] 4,366,743
[45] Jan. 4, 1983

[54] CONTROL SYSTEM FOR DOSER ACTUATOR

[75] Inventor: Michael J. Leszczewski, Mishawaka, Ind.

[73] Assignee: The Bendix Corporation, Southfield, Mich.

[21] Appl. No.: 200,870

[22] Filed: Oct. 27, 1980

[51] Int. Cl.³ .............. F15B 9/03; F15B 9/09; F15B 15/17
[52] U.S. Cl. .............. 91/363 R; 91/417 R; 91/457; 318/624
[58] Field of Search .......... 91/361, 363 R, 363 A, 91/417 R, 417 A; 318/599, 624

[56] References Cited

U.S. PATENT DOCUMENTS

| | | | |
|---|---|---|---|
| 3,266,378 | 8/1966 | Shaw | 91/363 R |
| 3,618,469 | 11/1971 | Wills et al. | 91/361 |
| 3,763,744 | 10/1973 | Fournell et al. | 91/417 R |
| 4,007,361 | 2/1977 | Martin | 318/561 |
| 4,256,017 | 3/1981 | Eastman | 91/417 R |

*Primary Examiner*—Paul E. Maslousky
*Attorney, Agent, or Firm*—William A. Marvin; K. C. Decker

[57] ABSTRACT

A control system 54 for a doser type hydraulic actuator 56 is disclosed. The doser actuator includes a pair of unequal area pistons 18, 20 on a common shaft 16 which are moved incrementally by injecting into or removing from a control pressure chamber metered quantities or doses of fluid. The doses are metered by timed openings of solenoid valves 32, 34 connecting the control pressure chambered to a supply 44 or return 48 pressure sources. The control system includes a base pulse width signal generator 106 which pulse modulates the solenoids as a function of the error between a requested position and an actual position. The base pulse width is modified by a correction means 108, 110, 112 when the error is within a predetermined band width. The correcting means compensates for the variations of the actuator when its response is uncertain with respect to the base pulse width.

6 Claims, 9 Drawing Figures

CONTROL SYSTEM FOR DOSER ACTUATOR

BACKGROUND OF THE INVENTION

The invention pertains generally to a control system for an electrohydraulic actuator and is more particularly directed to a control system for an electrohydraulic actuator of the doser type.

The concept of a doser type electrohydraulic actuator is known in the art. These actuators are based on the fact that if a measured quantity or "dose" of hydraulic fluid is injected or exhausted from the control chamber of a differential area piston actuator, its output makes a step movement commensurate with the size of the dose. The dose can be administered periodically in an on-off fashion to achieve a stepping motor type response to the digitally administered doses.

It is further known that the dose volume can be controlled by opening a solenoid valve for a discrete time period in response to an electrical pulse of predetermined duration from an electronic controller. The effective output travel rate of the doser actuator can thus be varied by changing the pulse frequency and/or the pulse width with the maximum slew rate of the device limited by the flow capacity of the solenoid valve if held continuously open. When operated in this manner, these actuators are compatible with, and easily controlled by modern digital electronic controls to produce a stepper motor-like response of variable speed.

A doser-type electrohydraulic actuator is more fully described in a copending application entitled "Differential Area Electrohydraulic Doser Actuator", U.S. Ser. No. 27,343, filed Apr. 5, 1979, now U.S. Pat. No. 4,256,017, in the name of James M. Eastman, which is commonly assigned with the present application. The disclosure of Eastman is hereby incorporated by reference herein.

However, unlike conventional stepper motors, doser actuators do not have inherent digital precision. This is so because, instead of dividing up the stroke of the actuator into precise small fractions for the steps, each dose is independently metered so the error is cumulative and there can be no precise correlation between the number of steps and output positions. Since, for most control applications, the positioning of an actuator is controlled in a closed loop manner based on the position of the controlled device, the available precision of a true stepping motor exceeds that which is necessary and doser type actuators can serve quite well in this capacity. The doser actuator will displace the stepper motor in many instances because of its lower cost and complexity while having a higher reliability.

An example of an adaptive closed loop control system for an electrohydraulic actuator is illustrated by U.S. Pat. No. 4,007,361 issued to Martin on Feb. 8, 1977. These closed loop actuator systems can be used to position various components of turbine engines such as fuel control valves, exhaust nozzles, and variable geometry vanes. Additionally, other aircraft uses may include the accurate positional control of the rudder, elevator, flaps or other components in response to pilot-initiated or automatic control systems inputs.

The equilibrium condition for closed loop operation of a doser actuator requires either a dead band for which no position correction is made until the positional error exceeds the effect of one minimum dose or step, or steady state limit cycling where the actuator takes a step, passes the desired position when steps backward past it, steps forward again, etc. A dead band is preferred because limit cycling reduces solenoid valve life and may detrimentally effect regulation of the parameter controlled by the actuator movement. However, for either equilibrium condition, steady state precision depends on having a small enough minimum doser step to accurately move the actuator piston to its final position. Smaller steps require shorter solenoid minimum on periods.

While it is true that the size of the dose can be made smaller with progressively shorter solenoid energization periods, it is equally true that if the dose is reduced substantially, its magnitude becomes more sensitive to second order effects. Thus, at small pulse widths not only is the actuator response nonlinear, but whether the pulse effects a change in actuator position at all becomes more uncertain. This is because each doser actuator has a threshold pulse width below which no actuator movement results. The magnitude of this threshold can vary significantly from unit to unit. Moreover, the threshold pulse width for each individual unit is load sensitive and depends upon the back pressure or pull on the actuation piston of the doser actuator at the time of pulse application. A pulse barely long enough to elicit an actuator response for an opposing load condition may produce a movement manyfold larger than the error tolerance range for an assisting load condition. This prohibits a steady state positioning of the actuator piston within a very narrow tolerance band.

However, there are conventional servo positioning actuators which employ torque motor operated valves. Although the torque motors are expensive, complex, and less reliable than the doser actuator, they act continuously down to very small error values. Therefore, to be competitive with these linear servo actuators, a doser actuator must be able to solve the problem of accuracy with respect to the threshold pulse width. To accomplish this, the control system must be able to supply pulse widths that are only marginally larger than the variable threshold pulses are equilibrium is approached.

SUMMARY OF THE INVENTION

The invention provides a control system for an electrohydraulic or electropneumatic actuator wherein the actuator piston can be positioned effectively within a very narrow tolerance band. The control system produces this accurate positioning by solving the problem of controlling the actuation member with very small pulse widths.

The control system preferably is used with an electrohydraulic actuator of the doser type. The doser actuator, regulated by the control system of the invention, includes a differential area piston which is positioned by a normally closed solenoid valve for each direction. The piston areas are adjusted so that at equilibrium a control pressure Px is intermediate between a supply pressure Ps and a return pressure Pr. Opening a supply solenoid valve, adjacent the supply pressure Ps, meters fluid flow into a control piston chamber causing the piston to move in a first direction and to subsequently stop when the valve closes. Similarly, opening a return solenoid valve adjacent a return pressure line Pr meters fluid flow out of the control piston chamber thereby causing the piston to move in the opposite direction and to stop again when the valve closes. The smallest discrete movements of the piston will occur for the shortest effective actuation period of the solenoid valves.

The control system for the doser actuator includes means for generating a pulse width signal. The pulse width signal is periodically transmitted to either the supply solenoid or to the return solenoid through gating circuitry. The gating circuitry directs the pulse width to either solenoid according to the desired direction of travel of the actuator piston. To determine a nominal value of the pulse width signal, the invention provides a function generator which generates a base pulse width signal proportional to the error between a requested piston position and the actual piston position as detected by a position sensor. The actuator piston moves proportionally in response to the pulse width signal to null the error. By selecting pulse durations producing movements proportional to the positional error, the piston effective velocity is made proportional to error, thus simulating the integrating response characteristic of high performance servo actuators.

The function generator can preferably comprise a look-up table which stores a schedule of values of the pulse width as a function of the error. The schedule is divided into four general regions for controlling movement of the actuator; equilibrium, nonlinear, linear, and saturated conditions, respectively. At equilibrium where the positional error is less than a predetermined error tolerance or dead band, the function generator will output a zero pulse width signal. For the nonlinear region, the schedule provides a base pulse width value varying with error and having a minimum value below the threshold pulse width of the actuator for an assisting load condition and a maximum value above the threshold pulse width of the actuator for a opposing load condition. In the linear region the base pulse width is scheduled essentially proportional to the error and at saturated conditions is a constant value.

The base pulse width signal in the nonlinear region is augmented as needed by a correction means generating a correction signal which assures the actuator response required to provide accurate final positioning of the device. The correction signal is generated by incrementing a counter means for every sampling period that the actuator fails to react in a specified manner to the pulse width commands. The count is then multiplied by a value for each increment to determine the duration added to the base pulse width signal. An additional increment is thus added at each sampling interval until the actuator responds in a specified manner at which time a selector circuit clears the counter.

In one preferred embodiment, the selector circuit resets the counter is the absolute magnitude of the positional error is not within a predetermined small error band. The band is defined by where the doser actuator movements are uncertain for small commanded pulse widths in the nonlinear operating range of the actuator. The correction signal will change the base pulse width by a small increment each sampling period for a positional error within the nonlinear region until an actuator position change carries the error out of the predetermined error band. The selector circuit then maintains the counter reset when the error is outside the region.

In the preferred implementation for the control, the selector circuit includes means to reset the counter means when either the polarity of the positional error changes, the change in positional error is greater than the dead band, or the positional error is less than the dead band value. This technique allows the counter means to increment when the error is greater than the dead band value and has not changed from the previous error by more than the dead band value.

The operation of the control in this embodiment thus produces an optimally small pulse width that will be effective to move the actuator piston independently of load and unit-to-unit variation in the nonlinear operating region of the doser actuator. This produces a significant advantage in that the dead band or error tolerance can be reduced to a minimum without causing steady-state limit cycling.

These and other objects, features and aspects of the invention will be more fully described and better understood if a reading of the following detailed description of the preferred embodiments is undertaken in conjunction with the attached drawings wherein:

DETAILED DESCRIPTION OF THE PREFERRED EMBODIMENTS

Figure 1:
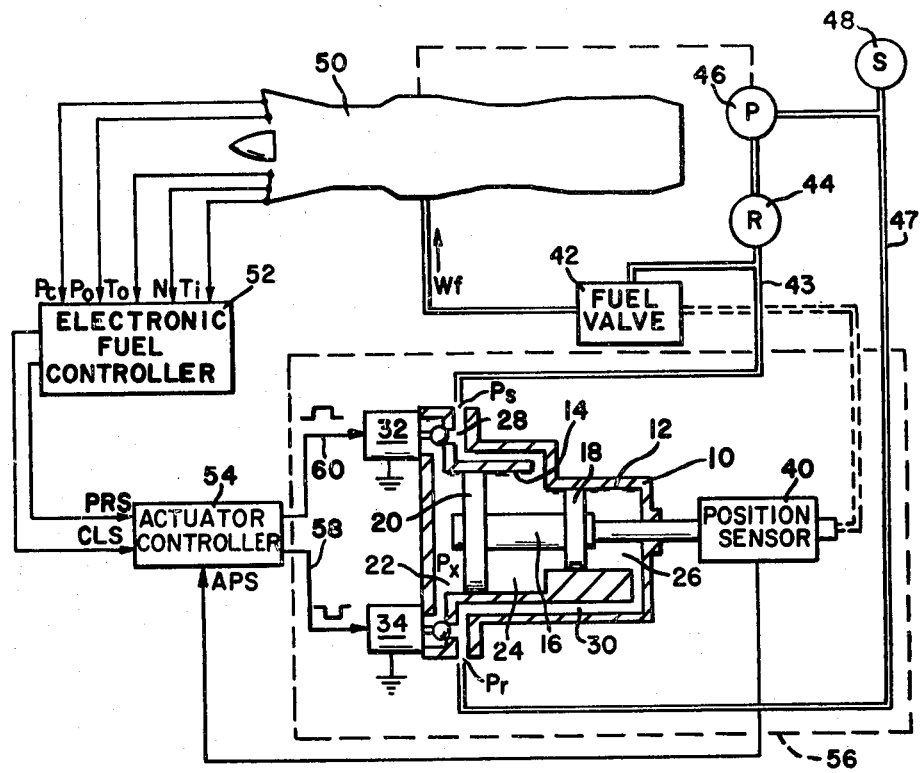
FIG. 1 is a system diagram of a control system, constructed in accordance with the invention, for an electrohydraulic actuator which positions a controlled device.

With reference now to FIG. 1 there is shown a closed loop actuator control system for an electrohydraulic actuator used in a gas turbine engine fuel control system. The actuator control system is shown as part of a fuel control for exemplary purposes only and should not be limited in its uses by such description. Normally, this control can be utilized for many types of positioning requirements and is specifically adaptable to extensive aircraft applications. Similarly, electrohydraulic or electropneumatic actuators other than that specifically illustrated can be controlled in the manner disclosed hereinafter.

The fuel control system which operably regulates the fuel flow, Wf, to the gas turbine engine 50, shown in outline, comprises an electronic fuel controller 52, an actuator controller 54, an electrohydraulic actuator 56, and a fuel valve 42. Basically, the electronic fuel controller 52 determines the required position of the fuel valve 42 and the actuator 56 does the positioning under the closed loop control of actuator controller 54.

To accomplish this the electronic fuel controller 52 samples at least one of the various operating parameters of the engine including, but not limited to the compressor output pressure Pc, the ambient pressure Po, the turbine inlet temperature Ti, the ambient temperature To, and compressor rotor speed N. From the sampled parameters the controller 52 calculates the position of the fuel valve 42 that will supply the engine with the correct fuel/air ratio.

The desired position of the fuel valve is transmitted to the actuator controller 54 as a requested position signal PRS. This position yields the optimum fuel/air ratio for the operating conditions of the engine as sensed during one sampling interval. Along with the position signal, a clock or periodic timing signal CLS is transmitted to the actuator controller 54 to designate the sampling intervals. The actuator controller 54 compares the PRS signal to an actual position signal APS generated by a position sensor 40. The APS signal is representative of the actual position of the valve 42. The comparison forms an error signal which can be used to move the actuator 56 to position fuel valve 42, accordingly. Closed loop control is provided by generating a periodic pulse width signal synchronous with the clock signal CLS to either solenoid 32 or solenoid 34 via signal lines 58, or 60, such that the actuator 56 positions the fuel valve in a stepwise manner in a direction to null the error.

The fuel valve position, as defined by the actuator piston, regulates the amount of fuel flow Wf delivered to the engine 50. The fuel valve is fed at a substantially constant pressure from a pressure regulator 44 via conduit 43. The pressure regulator 44 receives pressurized fuel from an engine-driven pump 46 drawing from a fuel source 48. The regulator recirculates part of the fuel delivered by the pump 46 back to its inlet to maintain a constant pressure head at its output. The actuator 56 is also fluidically connected to the regulator 44 via conduit 43 and receives the pressurized fuel at pressure Ps as a source of motive power. A return conduit 47 from the actuator 56 to the pump 46 is provided to return the fuel at pressure Pr once the needed power has been extracted.

The electrohydraulic actuator 56 is preferably of the doser type having bilateral directional capability and a positional movement corresponding to the duration of a pulse width signal. Such an acutuator and its alternatives are more fully described in the referenced Eastman application. The doser actuator is shown as having a housing 10 incorporating a pair of coaxial cylindrical bores 12 and 14 of unequal diameter. Positioned in bores 12 and 14 on the common shaft 16 which is connected to the desired device to be actuated (fuel valve 42), are a pair of pistons 18 and 20.

Pistons 18 and 20 in association with bores 12 and 14, define three control pressure chambers 22, 24, and 26. Chamber 24 communicates through a passage 28 in housing 10 with the source of hydraulic fluid or fuel under substantial pressure Ps. Chamber 26 communicates through a passageway 30 with the inlet side of the fluid pressure source 46 at pressure Pr.

Chamber 22 is a control pressure chamber whose pressure Px is varied through the action of a first normally closed source solenoid valve 32 which communicates with the high pressure Ps through passageway 28 and with a second normally closed return solenoid valve 34 which communicates with passageway 30 leading to the return pressure Pr. The areas of pistons 18 and 20 are designed such that at equilibrium the control pressure Px is intermediate between the supply pressure Ps and the return pressure Pr. Opening of the solenoid valve 32 meters high pressure fluid into the chamber 22, thereby causing the piston to move to the right as shown in the drawing and to stop when the valve closes. Similarly, opening of solenoid valve 34 meters fluid flow out of the chamber 22 to the return, causing the piston to move to the left and to stop again when the valve closes. The smallest discrete movements will occur for the shortest actuation pulses for solenoid valves 32 and 34.

Figure 2:
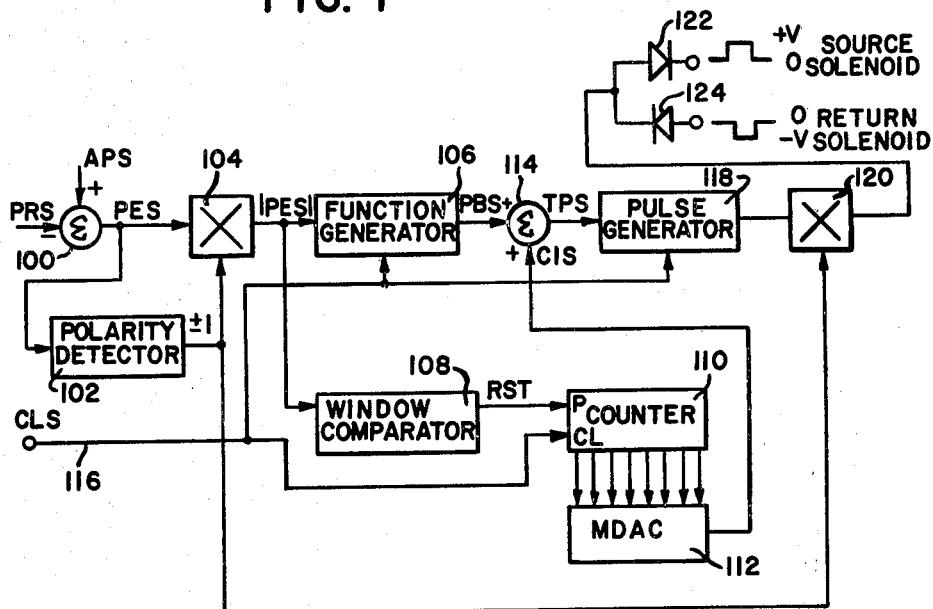
FIG. 2 is a detailed block diagram of the actuator controller for the system illustrated in FIG. 1.

If attention will now be directed to FIG. 2 the controller for the doser actuator will be more fully described. The doser actuator controller is a pulse width modulating controller which produces a pulse duration signal on signal line 58 or signal line 60 to control the on and off times of the solenoids 32, and 34 and thus, the position of the actuator. These pulse modulation signals are developed or generated as a function of the positional error signal.

The error signal is generated by a summing junction 100 having an input from the position request signal PRS and another input from the actual position signal APS. These two signals are differenced in the summing junction 100 and form a position error signal PES of a certain magnitude and polarity. In the embodiment shown the polarity will be negative if the PRS signal is greater than the APS signal and positive if vice versa. Next, the position error signal PES is fed into a polarity detector 102 which generates a multiplicative factor of either a +1 or −1 depending on the polarity of the signal. If the PES signal is positive, a +1 is generated and if negative, a −1 is generated.

The polarity sensor output is fed back to a multiplication circuit 104 which has as an additional input the PES signal. This provides an error signal |PES| which is equal to the absolute value of the position error signal regardless of the original polarity. The |PES| signal is fed into a function generator 106 which operates to provide a base pulse width signal PBS from a schedule which is a function of the sytem error. The PBS signal is generated once every sampling period by feeding the function generator with the clock signal CLS via signal line 116. The particular function generated by the function generator 106 will be more fully described hereinafter.

The base pulse signal PBS is combined in another summing junction 114 with a correction signal CIS to form a total pulse width signal TPS. The total pulse width signal is representative of the desired duration of the pulse width for a particular clock period. The TPS signal is transmitted to the input of a pulse generator 118 where a pulse width modulation takes place. The pulse generator 118 receives the timing signal CLS via signal line 116 to generate pulses at discrete sampling or timing intervals synchronously with the clock. The duration of the pulse is governed by the magnitude of the TPS signal. The pulse generator can be implemented as a monostable device which has an astable state regulated by the TPS signal. This device can have a fixed level output or it may include means for an initial "spike" of voltage to a high level followed by a reduction to a lower level for the remaining pulse duration. As is known, the "spike" reduces the threshold pulse width needed to open a solenoid valve.

The output pulses from the pulse generator 118 are transmitted to a multiplication circuit 120 which receives, as another input, the output of the polarity detector 102. The multiplication circuit multiplies the output pulse by either a +1 or −1 thereby generating pulses of +v, −v to govern the direction of the actuator position. The multiplier 120 with a pair of commonly connected diodes 122, 124 perform a gating function to the solenoids. If the polarity of the error signal PES is negative, the output of the pulse generator 118 is gated to the return solenoid 34 through diode 124 to move the actuator piston left. However, if the actual position signal APS is greater than the position request signal PRS, then polarity detector will output a +1 and the pulse output from generator 118 will be gated to the source solenoid 32 through diode 122 to move the piston right. The movement is in a direction calculated to null the difference between the PRS and APS signals.

The correction signal CIS is generated by the output of a correction means including a counter 110 which is clocked by the timing or sampling interval signal CLS from signal line 116. Depending on the count in the counter 110, a scaling circuit 112, illustrated as a multiplying digital-to-analog converter, produces the CIS signal to increase the base pulse width signal to the total pulse width value. The counter 110 counts every timing interval unless it is reset by a reset signal RST from a selector circuit 108.

The reset signal RST is applied to a reset input P of the counter and clears the counter when at a high level. The selector circuit, illustrated in this embodiment as a window comparator, resets the counter 110 for every sampling interval that the |PES| signal is outside of a particular error band from a lower limit LEL to an upper limit UEL. This operation is illustrated graphically in FIG. 6. Only when the error signal is within this band width does the selector circuit permit the counter to increment on receipt of the clock signal CLS and produce the CIS signal. As soon as the error moves outside the band, the selector circuit 108 will reset the counter and the base pulse signal PBS will be the only component of the total pulse signal TPS.

Figure 4:
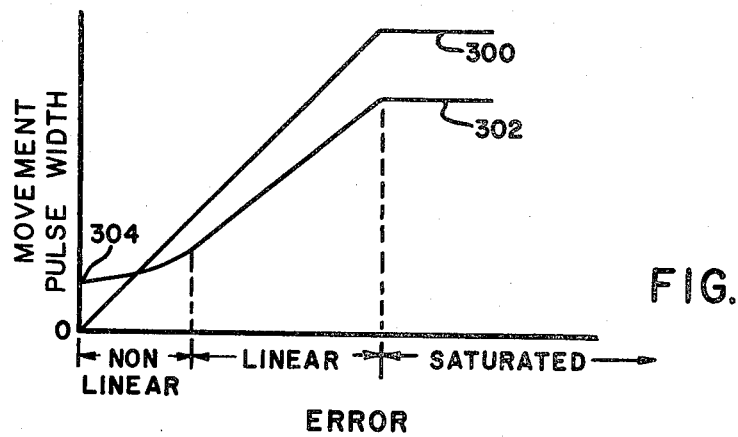
FIG. 4 is a graphical representation of the nominal position and pulse width for the doser actuator illustrated in FIG. 1 as a function of positional error values.
Figure 5:
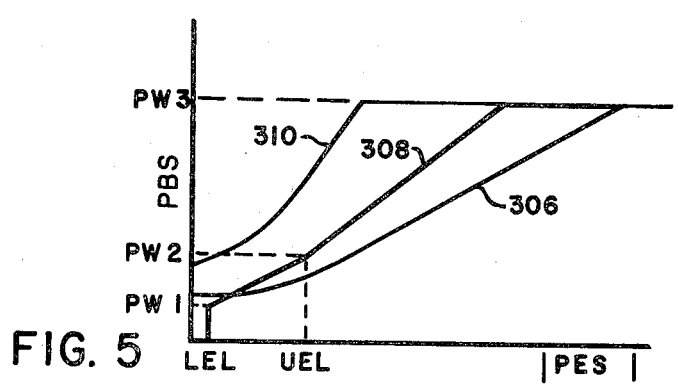
FIG. 5 is a graphical representation of the base pulse width schedule of the doser actuator illustrated in FIG. 1 as a function of positional error values with a superposition thereon of fully loaded and unloaded pulse width schedules.
Figure 6:
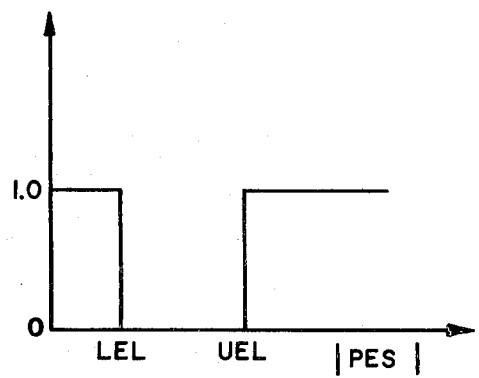
FIG. 6 is a graphical representation of the output of a window comparator 108, illustrated in FIG. 2, as a function of the absolute value of the positional error.

To more fully explain the control system, reference is now made to FIGS. 4, 5 and 6. The graphical representation 300 in FIG. 4 illustrates on the ordinate axis the desired movement per sampling interval as a function of the error signal for the doser actuator as illustrated in FIG. 1. The curve 300 indicates that the desired movement is proportional to the error signal. The slope of curve 300 is equivalent to the gain of an integrating servomechanism and is selected for the best system performance based on the actuator dynamics. If the actuator error signal indicates that the actual piston position is 4 units from a desired position, then the desired movement per sampling interval will be 4 units of magnitude in accord with the selected controller gain.

Curve 302 indicates a nominal pulse width schedule for the actuator needed to produce the movement indicated by curve 300. Curve 302 consists of a nonlinear region beginning at a minimum or threshold pulse width 304 and ending at the beginning of the region labeled linear. The linear region extends over most of the working error values until the pulse width is large enough to keep the solenoid value continuously open for the full sampling interval. At this point the curve reaches a plateau and the system is in a saturated region. It is noted in the nonlinear region that a non-zero threshold pulse width 304 is needed to provide any movement at all from the actuator and that the desired change in pulse width with respect to the change in position error cannot be accurately scheduled. Only when the knee of curve 302 is passed does the pulse width become a substantially linear function with respect to error.

The graphical representation of pulse width as a function of error for the actuator has been reproduced in FIG. 5 to illustrate changes in the nominal schedule for changes in load. Curve 306 represents a desired pulse width versus error schedule for a doser actuator in an unloaded condition or when there is a maximum load assisting the direction of movement. The schedule of desired pulse width as a function of error changes markedly when the doser actuator is loaded to oppose movement as is shown by curve 310. For this condition greater pulse widths for the identical positional error are needed at all points on the graph. Within the area between the curves 306 and 310 are a family of curves that depend on the loading of the doser actuator piston. The doser control, however, must be able to cope with this external loading without an undue adverse effect on system performance.

Therefore, a graphical representation 308 is provided which forms the schedule stored in function generator 106. The base pulse width signal is generated from this schedule. The linear portion of the waveform 308 provides an integrating response proportional to the measured error. The waveform 308 includes an upper error limit UEL for which a corresponding pulse width PW2 is in excess of the minimum pulse width of the fully loaded curve 310. The schedule 308 further includes a lower error limit LEL for which the corresponding pulse width PW1 is below the minimum pulse width for curve 306. The lower error limit LEL establishes the steady-state actuator position tolerance and truncates the schedule providing a dead band for error values between the lower error limit and zero.

In operation, the function generator 106 schedules the base pulse width from the curve 308 and the gating and polarity detector act to direct the pulses to null the error. If the positional error is greater than the linear region of curve 308, then a saturated pulse width PW3 is output. At saturation the pulse width is equal to the sampling interval between clock signals and the appropriate solenoid is held continuously open. Depending upon the load on the actuator, the actuator will either step at the maximum slew velocity or a slower rate. The heavier the assisting load, the faster the travel of the actuator and conversely, the heavier the opposite load the slower the velocity for each sampling period.

When the error is within the linear region of the schedule 308, smaller and smaller steps are taken as the actuator begins to null the error. A heavier loaded actuator will take more time periods to reach the same position, but it invariably moves in the right direction. This action forces the positional error into the nonlinear region of the schedule between the limits LEL and UEL.

Without the control the dead band would have to be as large as the upper error limit UEL for fully loaded actuators. Pulse widths below PW2, because they were not in excess of the fully loaded threshold pulse, would not produce any additional movement. However, if PW2 were used, such large pulse widths would produce limit cycling for lightly loaded actuators.

The control solves this dilemma by adding increments to the base pulse width for every sampling period that the error is between LEL and UEL. Thus, if the error is below LEL, then no pulse width is generated and the system is in the dead band at equilibrium, but if an error just above LEL is produced, then the correction circuit will add increments every sampling period until the threshold pulse for the present load on the actuator is reached. The pulse width will then produce the minimum step available from the actuator for that load to force the error into the dead band.

In this manner, no matter what the load on the doser actuator happens to be, the system will always be guaranteed to make some movement in a direction to null the error. Thus, by adding small increments to the base schedule when the error is between the two error limits, the doser actuator will reduce the error. However, without knowing the particular load on the doser actuator at any time, the increments that are added to the original base schedule are very small to prevent the actuator from overshooting the dead band and possibly limit cycling. In this particular embodiment, the increments are preferably on the order of 0.1 of PW1, the minimum threshold pulse width.

Figure 3:
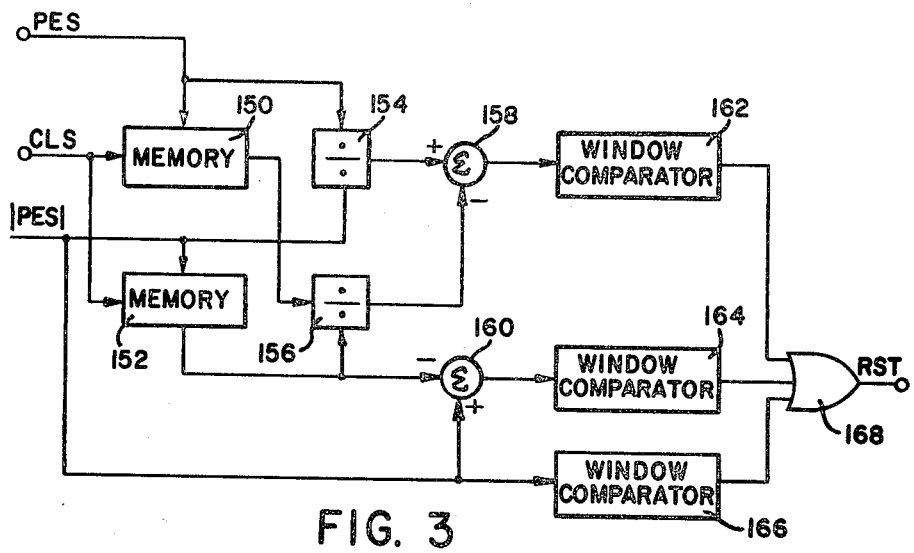
FIG. 3 is a detailed functional block diagram of a second embodiment of a selector circuit for the actuator controller illustrated in FIG. 2.

FIG. 3 shows the invention as another embodiment of the selector circuit for the control circuit illustrated in FIG. 2. The selector circuit in this Figure performs the same function as the selector circuit in FIG. 2, namely, resetting the counter 110 with respect to certain special conditions. However, the control law is modified by selecting different conditions under which the counter resets.

The selector circuit in FIG. 3 has three separate inputs which, when combined in the logic circuit shown, form the reset signal RST output from an OR gate 168. The first input is the position error signal PES which is received by a memory 150 and a divider 154. Memory 150 stores the present error signal PES and outputs the previous error signal PES (tp) for every clock signal. The second signal input is the absolute value of the position error signal |PES| received by memory 152, divider 154, summation circuit 160, and a window comparator 166. The third input is the clock signal CLS input to the two memory elements 150 and 152.

The output of the memory element 152 is fed to one input of the divider 156 and the other input of summation circuit 160. The second input to the divider 156 is transmitted from the output of memory 150. The output of the summation circuit 160 is transmitted to a second window comparator 164. The output of the two dividers 154 and 156 are differenced in a summation circuit 158 whose output is transmitted to a third window comparator 162.

The outputs of all three window comparators 162, 164, and 166, respectively, form bilevel logic signals for the input to the OR gate 168. A high level signal on any of the window comparator outputs will produce a high output from the OR gate 168 and transmit the reset signal RST to the counter 110.

Figure 9:
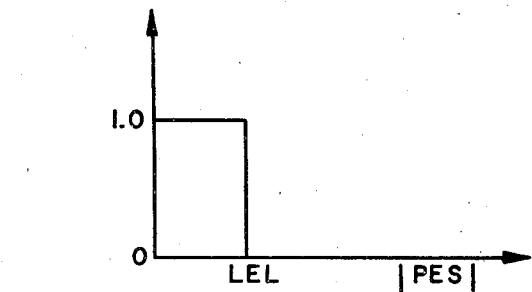
FIG. 9 is a graphical representation of the output of a window comparator 166 illustrated in FIG. 3 as a function of the absolute positional error.

In operation the three window comparators determine special conditions during which the counter should be reset. The window comparator 166, receiving the absolute value of the error signal, compares the signal |PES| and the lower error limit LEL. A graphical representation of the operation is shown in FIG. 9 where the window comparator will output a zero value for |PES| signals higher than the lower limit LEL limit and a high level to reset the counter if the error is not greater. Therefore, the comparator 166 will reset the counter if the error is less than the dead band.

Figure 8:
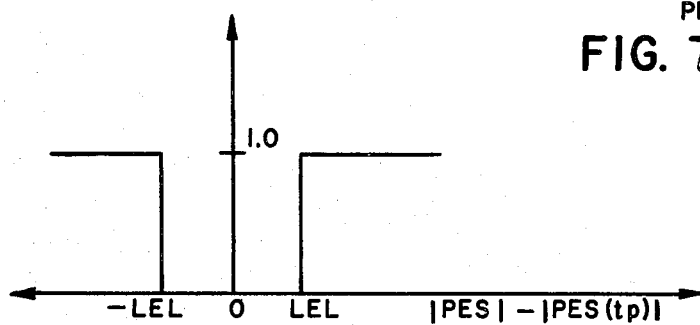
FIG. 8 is a graphical representation of the output of a window comparator 164 illustrated in FIG. 3 as a function of the difference between the absolute values of the position error for consecutive time periods.

Similarly, the window comparator 164 compares the output of the summation circuit 160 to the reference values shown graphically in FIG. 8. The output of the window comparator 164 is a zero when the output of the summation circuit 160 falls between a −LEL and a +LEL. Otherwise, for values more positive or negative, the output of the window comparator is a high level and the counter is reset. The output of the summation circuit 160 is the difference between the output of memory 152 and the absolute value of the error signal |PES|. Memory 152 stores the present absolute error signal |PES| and outputs the previous absolute error signal |Pes (tp)| for every clock signal. In this manner the absolute value of the position error signal for the previous sampling period may be compared to that of the present period. If the difference, taken in summation circuit 160, is within the dead band from −LEL to +LEL, then the counter will not be reset. However, if the difference is greater than this, the counter will be reset by a high level output from the window comparator 164. Therefore, if the change in the error signal is greater than the dead band, the comparator 164 will reset the counter.

Figure 7:
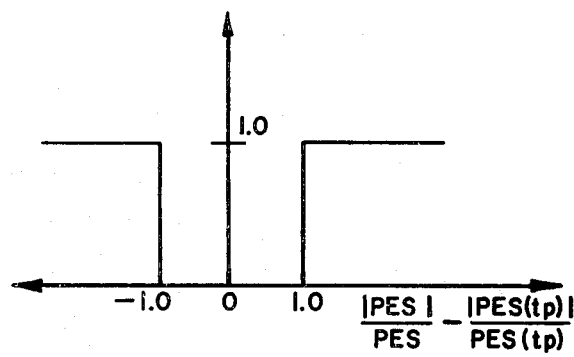
FIG. 7 is a graphical representation of the output of a window comparator 162 illustrated in FIG. 3 as a function of the difference of two positional error ratios.

Additionally, as illustrated in FIG. 7, window comparator 162 compares the output of the summation circuit 158 with reference values of a −1 and a +1. If the output of the summation circuit 158 is between these two reference values, then the output from the window comparator 162 will be zero. If the output of the summation circuit 158 is more negative or positive, then the comparator output will be a high level. The input to the summation circuit 158 is from the two dividers 154 and 156 forming ratios of the absolute value of the error signal |PES| divided by the error signal PES and the absolute value of the previous error signal |PES (tp)| divided by the previous error signal PES (tp). These two ratios are subtracted. If their difference is between the two reference points, it signifies that the sign of the error has not changed since the previous time period. Therefore, comparator 162 will reset the counter if the sign changes for the error value for consecutive sampling periods.

This selector circuit is an improvement to the selector circuit illustrated in FIG. 2 and provides another advantageous control law. For the previous controller it is possible for several successive small piston movements to occur in the error range between LEL and UEL. Thus, each pulse width must be progressively larger because it increases by an increment with each sampling period. Consequently, although the increment is small, overshoot beyond the dead band will probably be induced by the last pulse before the error is reduced to less than the dead band in this situation. The controller will then have to taken an extra step to null the error. By limiting UEL to a value just larger than for the highest anticipated threshold pulse, this effect is acceptably controlled.

In the embodiment of FIG. 3, the counter only increments when the error is greater than the dead band, has not changed sign, and has not changed from the previous error sample by more than the dead band value. Since essentially no excess increments are required for the last pulse that drives the error into the dead band, the value of the increment can be made somewhat larger for this alternate control logic. Consequently, the final convergence of the error into the dead band will be faster. Also, this alternate logic could accommodate conceivable anamolous load conditions which could drive the solenoid valve response threshold substantially higher than the fully loaded PW2 pulse width without allowing the actuator to hang up with an error greater than the upper error limit UEL.

While the preferred embodiments of the invention have been shown and described, it will be obvious to those skilled in the art that various modifications and variations may be made thereto without departing from the spirit and scope of the invention as hereinafter defined in the appended claims.

I claim:

1. In a closed loop control system for an electrohydraulic actuator having means responsive to a periodic pulse width signal, for moving the actuator in one direction; means, also responsive to the pulse width signal, for moving the actuator in the other direction; means for generating the pulse width signal from a schedule with a dead band wherein the schedule is based upon an error signal representative of the difference between the actual actuator position and a desired actuator position; means for gating said pulse width signal to said moving means according to the polarity of the error signal such that the actuator moves in a direction to null said error signal; means for correcting the pulse width signal with an incrementally increasing signal, said increasing signal being incremented each time period that the scheduled pulse width is uncertain to move the actuator in a direction to null the error, said correcting means having a counter which is clocked by a timing signal for each timing period, and means receiving the output count of said counter for converting the count into said increasing signal, wherein the improvement comprises:

means for selecting time periods when the counter is cleared such that the counter is cleared when the polarity of said error signal changes, said error signal is less than the dead band value, or the change in the error signal is greater than the dead band.

2. A closed loop control system for an electrohydraulic actuator as defined in claim 1, wherein said selecting means comprises:

means for comparing the absolute value of the error signal with the dead band limits;
means for comparing the change in the absolute value of the error signal with the dead band limits; and
means for comparing the polarity of said error signal with the polarity of the error signal for the previous time period.

3. A closed loop control system for an electrohydraulic actuator as defined in claim 2, werein said absolute value comparing means includes:

a window comparator which outputs a high level signal if the absolute value of the error signal is within the dead band.

4. A closed loop control system for an electrohydraulic actuator as defined in claim 3, wherein said change in the absolute value comparing means includes:

means for storing the absolute value of the error signal for the previous period;
means for differencing the present and previous absolute value error signals; and
a second window comparator which outputs a high level signal if the difference between the present and previous error signals is larger than the dead band.

5. A closed loop control system for an electrohydraulic actuator as defined in claim 4, wherein the polarity comparing means includes:

means for storing the absolute value of the error signal for the previous period;
means for storing the value of the error signal for the previous period;
means for dividing the absolute value of the error signal by the error signal and generating a first quotient;
second means for dividing the absolute value of the previous error signal by the value of the previous error signal and generating a second quotient;
means for differencing said first and second quotients; and
third window comparator means which output a high level signal if the difference between said first and second quotients is greater than a positive one or less than a negative one.

6. A closed loop control system as defined in claim 5, wherein said selecting means includes:

an OR gate, receiving the high level outputs of said window comparator, said second window comparator, and said third window comparator, for generating a high level reset signal to said counter whenever any of the comparators generate a high level output.

* * * * *